Aug. 10, 1948.   G. E. WHITE ET AL   2,446,567
ALTERNATING CURRENT RATE CIRCUITS
Filed Dec. 30, 1941   4 Sheets-Sheet 1
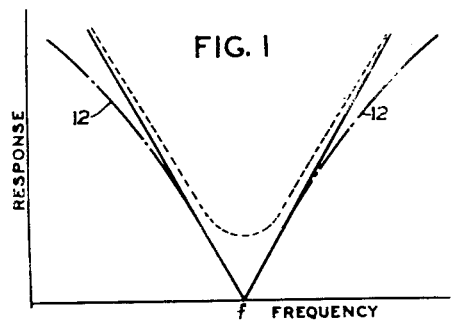
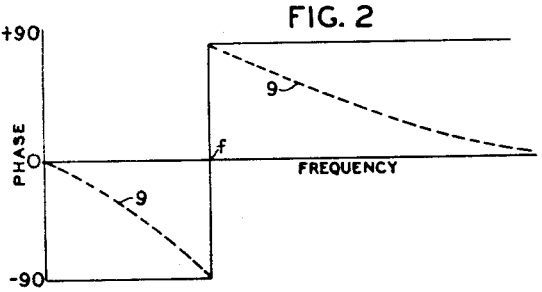
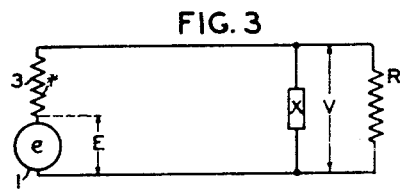
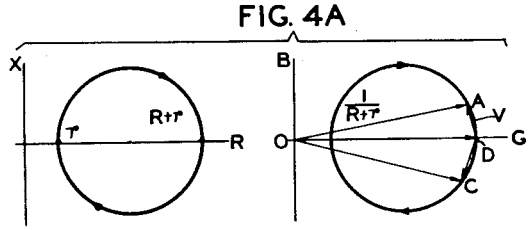
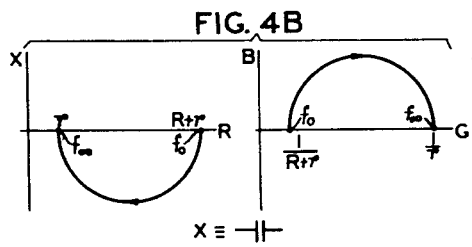
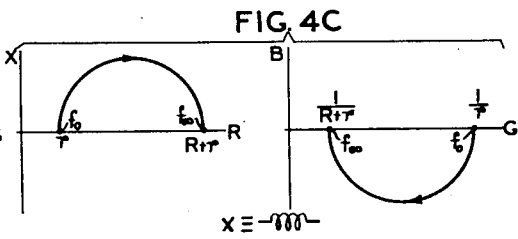
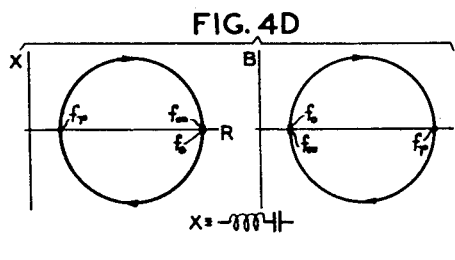
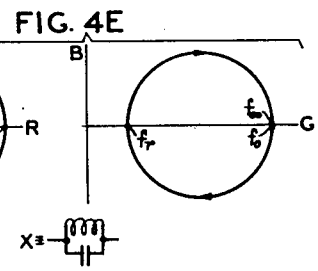
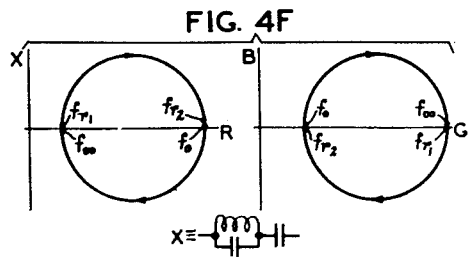
INVENTORS:
GIFFORD E. WHITE
MORRIS RELSON
BY
Paul B. Hunter
THEIR ATTORNEY Aug. 10, 1948.   G. E. WHITE ET AL   2,446,567
ALTERNATING CURRENT RATE CIRCUITS
Filed Dec. 30, 1941   4 Sheets-Sheet 2

$Z_a = R_a(f) + jX_a(f)$
$Z_b = R_b(f) + jX_b(f)$

INVENTORS
GIFFORD E. WHITE
MORRIS RELSON
BY
Paul B. Hunter
THEIR ATTORNEY

Aug. 10, 1948.                G. E. WHITE ET AL                2,446,567
                        ALTERNATING CURRENT RATE CIRCUITS
Filed Dec. 30, 1941                                          4 Sheets-Sheet 3
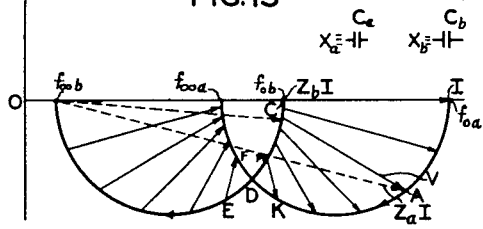
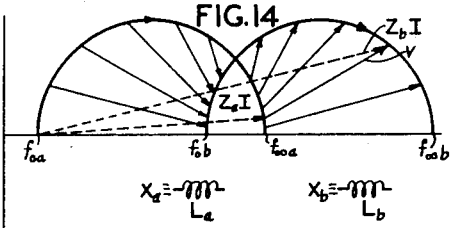
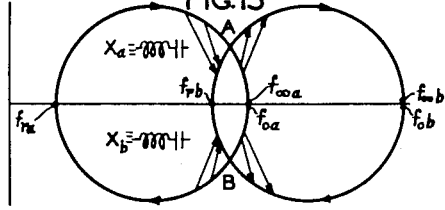
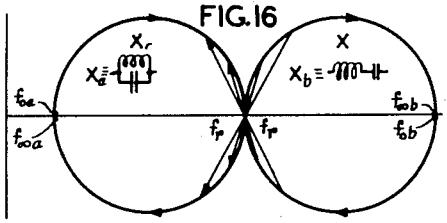
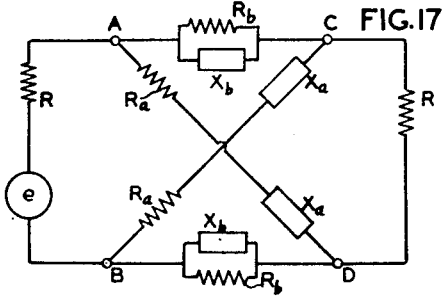
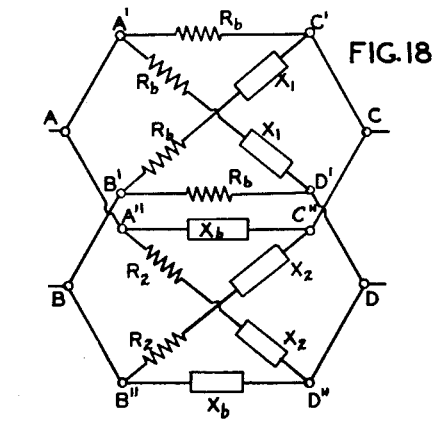
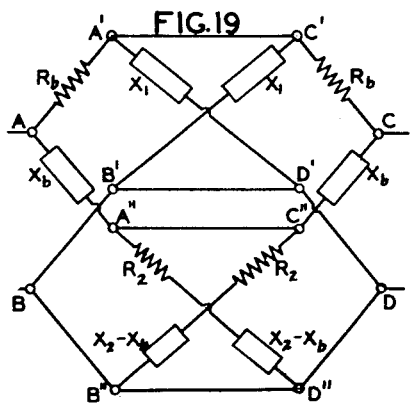
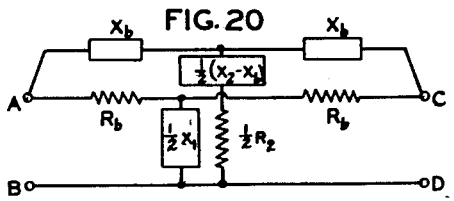
INVENTORS:
GIFFORD E. WHITE
MORRIS RELSON
BY
THEIR ATTORNEY Patented Aug. 10, 1948

2,446,567

UNITED STATES PATENT OFFICE 2,446,567

ALTERNATING CURRENT RATE CIRCUITS

Gifford E. White, Hempstead, and Morris Relson, Kew Gardens, N. Y., assignors to The Sperry Corporation, a corporation of Delaware Application December 30, 1941, Serial No. 425,002

16 Claims. (Cl. 318—30)

The present invention is concerned with the art including alternating current rate circuits.

In the control of servo-motor mechanisms, automatic control circuits, follow-up devices and the like it is necessary in many applications to actuate a driving motor from an electrical voltage derived from some sort of error measuring apparatus. A common example of this type of error is the relative angular displacement between a control shaft and a follow-up shaft, such as may be measured by the conventional "Selsyn" signal generator or other pick-off device. This error voltage may be used to cause the follow-up shaft to assume the position of the control shaft, as in common follow-up circuits. Alternatively, this error voltage may be used to control other apparatus.

As has been previously shown, it is often desirable to modify this error voltage before applying it to the control of a driving motor. One type of modification often desirable is the provision of anticipation effects so that a large corrective effect may be obtained before the amount of error has actually become large enough to actuate a control device depending upon the magnitude of error alone. Such anticipation effects may be derived, as has been shown in Minorsky Patents No. 1,703,280 and No. 1,703,317, issued February 26, 1929, by the addition of component voltages having wave shapes which are time derivatives of the wave shape of the error voltage.

In many applications the error voltage derived is alternating in character at a particular operating frequency, usually a low frequency of 400 cycles or less, whose amplitude varies proportionally to the magnitude of the error and whose phase corresponds in sense to the sense of the error; that is, for error in one sense, the error signal will have a predetermined phase, and for error in the opposite sense, the phase of the error signal will be opposite. Since the error signal is alternating in character, it is desirable for ease in combining that the derivative or rate signal also be alternating in character, of the same frequency as and having amplitude proportional to the time derivative of the error signal; that is, proportional to the time derivative of the modulation envelope of the error signal.

Up to the present time, the main method of obtaining the rate or derivative signal has been to rectify or demodulate the error signal, thereby obtaining its modulation envelope, passing this modulation envelope through one of the well known networks for taking a derivative of a unidirectional slowly varying voltage, and then remodulating this derived voltage upon the carrier frequency.

The present invention is directed towards a simplified circuit for directly obtaining the modulated first, second, or higher, derivative signal without the necessity of using rectifiers or modulators or any type of vacuum tube circuits, thus avoiding the defects of such electronic circuits, which introduce undesirable errors due to their non-linearity and their unilateral characteristics.

Accordingly, it is an object of the present invention to provide bilateral rate circuits for directly deriving modulated rate signals from modulated error signals.

It is a further object of the present invention to provide a simplified rate circuit for obtaining directly, without the use of vacuum tube circuits, an output signal of an alternating nature whose modulation envelope is a time derivative of the modulation envelope of a controlling alternating signal.

A further object of the present invention is to provide an improved reactance-resistance bridge network for obtaining alternating current rates.

Still another object of the present invention is to provide improved alternating current rate circuits using T-networks.

It is still another object of the present invention to provide improved alternating current rate circuits using parallel-T resistance-reactance networks.

It is a further object of the present invention to provide improved alternating current rate circuits employing negative reactance elements.

Further advantages and objects of the present invention will be apparent from the accompanying specification and drawings, in which the invention is embodied in concrete form.

Referring to the drawings,

Figs. 1 and 2 are curves showing desirable characteristics for the circuit of the invention.

Fig. 3 shows one type of practical embodiment of the invention.

Figs. 4A to 4F show impedance and admittance diagrams useful in explaining the operation of the circuit of Fig. 3 under various conditions.

Figs. 11 to 16 show impedance diagrams useful in explaining the theory of bridge-type reactance-resistance rate circuits of the type shown in Fig. 8.

Fig. 17 shows a further embodiment of the invention.

Figs. 18 and 19 are explanatory diagrams showing the derivation of the modification of Fig. 20 from the modification of Fig. 17.

Fig. 20 shows a preferred form of the invention using parallel-T networks.

Figure 25:
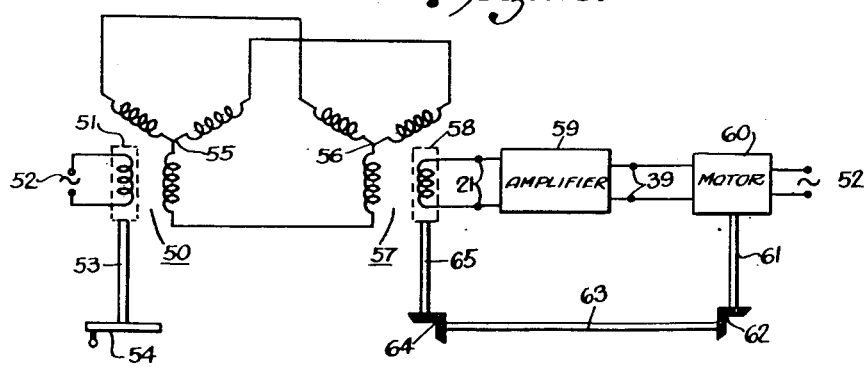

Fig. 25 schematically illustrates a control system embodying the present invention and which is employed to control a servomotor.

In the usual method of obtaining error signals, alternating voltages are used because of the ease of handling and the simplified error measuring devices which are thus made possible. In such an error measuring device, the output or error signal is usually zero for zero error. For other values of error, the error signal is an alternating signal of predetermined frequency whose amplitude or magnitude varies proportionally with the magnitude of the error and whose phase sense corresponds to the sense of the error. A direct analogy may therefore be drawn between the error signal and a modulated carrier having the carrier frequency suppressed, in the following manner: If the error is assumed for the time being to vary sinusoidally with time the alternating error signal can be written as $$V_e = E \sin \omega t \sin \omega_e t \qquad (1)$$

where $V_e$ is the alternating error signal, $\omega$ is $2\pi$ times the operating frequency $f$, $E$ is the maximum magnitude of the sinusoidally varying error having frequency of variation $\omega_e/2\pi$ and $t$ is the time.

This restriction to a sinusoidal variation of error is in reality no restriction upon the generality of the theory presented, since, as is well known in linear circuits, any complex wave shape may be resolved into sinusoidal Fourier components, each being a simple sinusoid, as used in the Equation 1.

In terms of a Fourier expansion, this can also be written as:

$$V_e = \frac{E}{2}[\cos(\omega-\omega_e)t - \cos(\omega+\omega_e)t] \qquad (2)$$

This will be seen to correspond exactly to a carrier-suppressed modulated wave of carrier frequency $f$ and modulation frequency $$\frac{\omega_e}{2\pi}$$

where, as is well known, the sideband frequencies are present but the carrier frequency $f$ is absent. Accordingly, the alternating error signal may be considered to be a suppressed-carrier modulated wave, where the modulation wave is the error-time characteristic (that is, the variation of error with time) and the carrier frequency is the operating frequency $f$.

If the same carrier frequency is assumed modulated in the same manner, that is, with suppressed carrier, but by the derivative of the error, there is obtained:

$$V_r = E\omega_e \cos \omega_e t \sin \omega t \qquad (3)$$

$V_r$ being the rate signal. This expression (3) can be written in terms of sidebands as:

$$V_r = \frac{E}{2}\omega_e[\sin(\omega-\omega_e)t + \sin(\omega+\omega_e)t]$$

$$= \frac{E}{2}\omega_e[\cos(\omega-\omega_e-90°)t - \cos(\omega+\omega_e+90°)t] \qquad (4)$$

Comparing Equations 2 and 4, it will be seen that if the original error wave could be operated upon in such manner that the sideband frequencies are shifted by $+90°$ or $-90°$ depending upon whether they are greater or less than the carrier frequency, and then multiplied by an amplitude factor proportional to their frequency departure from the carrier frequency (which is the operating frequency), the result would be the carrier modulated by the time derivative of the original envelope, or the desired alternating rate signal.

The theoretical desired response in amplitude and phase of a network which will accomplish this is shown by the solid lines in Figs. 1 and 2, which clearly show that the amplitude of the rate circuit output must be proportional to the frequency deviation from the carrier or operating frequency $f$, and the phase of each sideband component of the output must be 90° ahead of the corresponding component of the error signal if its frequency is greater than that of the carrier or 90° behind if the frequency is less than that of the carrier.

Fig. 3 shows a circuit which will approximate these desired characteristics. This circuit comprises an alternating error voltage source 1 having voltage amplitude E and an internal resistance 3 of value $r$, across which is connected a parallel circuit comprising a reactance X and a resistance R. Error source 1, of course, produces a varying magnitude, reversible-phase alternating error signal voltage which, as discussed above, may be resolved into components of different frequencies, corresponding to sideband components of the error signal wave, these frequencies depending on the variation of error with time.

Fig. 4A shows the impedance and admittance diagrams of the circuit of Fig. 3 as the frequency varies; that is, each point on these diagrams represents the values of effective reactance and resistance or effective susceptance and conductance for a particular frequency component of error voltage. As the frequency varies, the locus of the points representing the impedance or admittance of the entire circuit connected across voltage source 1 will follow circular diagrams as shown in Fig. 4A. The particular law of variation with frequency followed by the locus proceeding around these circles will depend upon the nature and value of reactance X, which in the general case may be of any type; that is, it may comprise any desired combination of capacitance and inductance.

For the time being, the internal resistance of the inductance and capacitance elements constituting the reactance X will be neglected, since the theory may be explained more simply on that basis.

If it is assumed, firstly, that reactance X of Fig. 3 is a simple pure capacitance, the impedance and admittance diagrams will be as shown in Fig. 4B. In this case, for a zero frequency component of source 1, reactance X will present infinite impedance in parallel with resistance R, and hence the total impedance in circuit with source 1 will be a resistance $r+R$. The corresponding admittance will be $$\frac{1}{r+R}$$

For an infinite frequency component of source 1, reactance X, assumed to be a pure capacitance, will be a direct short-circuit across resistance R, and hence the total impedance of the circuit connected across source 1 will be a resistance of value $r$. The corresponding admittance will be $$\frac{1}{r}$$

These points are indicated by $f_0$ and $f_\infty$ on the impedance and admittance diagrams of Fig. 4B.

For frequency components in between these extreme values, the impedance and admittance of the circuit will be represented by points along the semi-circles connecting $f_0$ and $f_\infty$ as shown in Fig. 4B. It will be noted, as is to be expected, that the effective reactance of the circuit across source 1 is always negative; that is, the semi-circle on the impedance diagram is below the zero reactance axis, since the reactance is of a capacitive nature. For the same reason the effective susceptance of the circuit is always positive, as shown.

If now, it is assumed that this reactance X of Fig. 3 is a pure inductance, the impedance and admittance diagrams will be as shown in Fig. 4C. Here again the diagrams will be semi-circles whose terminating points represent respectively the zero frequency and infinite frequency components of source 1. However, it will be seen that, for a zero frequency component, reactance X provides a direct short-circuit across load resistance R and the net effective impedance is therefore $r$, whereas, for an infinite frequency component, reactance X offers infinite impedance, and the net impedance of the circuit will be $r+R$. The corresponding admittances are respectively $$\frac{1}{r} \text{ and } \frac{1}{r+R}$$

as shown.

For intermediate frequency components again the impedance locus is a semi-circle between the points representing the zero frequency and infinite frequency components. The effective reactance in this case is always positive since X is a pure inductance. Examining Figs. 4B and 4C, it is seen that the circle diagrams are always traversed clockwise for increasing frequency.

If now, reactance X is assumed to be composed of pure inductance and pure capacitance connected in series, the impedance diagrams will now be as in Fig. 4D. Thus, at zero frequency, the condenser offers a direct open-circuit or infinite impedance across load resistance R, and the net impedance of the circuit will be a maximum $r+R$, as at $f_0$. As the frequency increases, the reactance is predominantly capacitive until a point is reached at which the net reactance is zero; that is, series resonance occurs, and at this point the load resistance R is short-circuited, causing the net impedance of the circuit to have the value $r$, as shown by the point $f_r$. As the frequency is increased still further, the net reactance becomes inductive (positive) and increases until, at infinite frequency, the inductance offers infinite impedance and again reactance X has no effect on the load resistance R, as shown by the point $f_\infty$. In this case, it will be seen that the impedance diagram is a complete circle whose points corresponding to zero frequency and to infinite frequency overlap, being the point of maximum impedance $r+R$, whereas the point of minimum impedance $r$ is the point of series resonance $f_r$. The admittance diagram, of course, is the mathematical inversion of the impedance diagram, and in this instance zero frequency and infinite frequency offer points of minimum admittance and resonance offers the point of maximum admittance.

If now it is assumed that the reactance X of Fig. 3 is composed of parallel-connected inductance and capacitance, the diagrams of Fig. 4E are obtained. Thus, at zero frequency, the inductance of X offers a short-circuit across the load resistance providing a low net impedance $r$. As the frequency increases, a point of resonance is reached at which the reactive part of the circuit has maximum and theoretically infinite impedance, thereby providing maximum impedance $r+R$ for the entire circuit corresponding to point $f_r$. As the frequency is increased still further, up to infinite frequency, the capacitance in reactance X offers a direct short-circuit across the load resistor R, again providing a minimum net impedance $r$.

Here again the impedance diagram is a circle but now minimum impedance occurs at zero and infinite frequency while maximum impedance occurs at the resonant frequency. The admittance diagram is again the inverse of the impedance diagram.

As a further example, let it be assumed that the reactance X of Fig. 3 comprises a parallel connected inductance and capacitance in series with a further capacitance. Here again the impedance diagram is a circle. With zero frequency, the reactance is a maximum, in fact, represents open circuit across resistance R, and maximum effective impedance is obtained, as shown by point $f_0$ in Fig. 4F. As the frequency increases, a point is reached at which the parallel connected capacitance and inductance offer a net inductance, which resonates in series fashion with the series connected capacitance, providing a series resonant circuit connected across load resistance R. This provides a point of minimum impedance $f_{r_1}$. As the frequency is increased still further, a point is reached at which the parallel connected inductance and capacitance resonate to form a parallel resonant circuit having theoretically infinite impedance. This infinite impedance connected across resistance R again provides a net maximum impedance $r+R$ as shown by point $f_{r_2}$. As the frequency is still further increased, up to infinite frequency, the two capacitances of reactance X form a short-circuit across load resistance R and provide a low net impedance as shown by point $f_\infty$. The admittance diagram is again the inverse of the impedance diagram. Many other examples of types of reactance X depending upon frequency in many different ways may be provided.

It will be evident, however, from the foregoing that the impedance locus and admittance locus are always circles, with centers on the resistance and conductance axes respectively, and that each point where the circle crosses the resistance or conductance axes can represent only a point of zero frequency, infinite frequency or resonant frequency. For simple capacitance and inductance, there is no resonant frequency, hence the circle can touch the resistance or conductance axes at only two points, which means that the diagram must be a semi-circle. For a simple series or parallel resonant circuit composing reactance X, one resonant point is provided in addition to the zero and infinite frequency points so that the circle is complete. For more complicated circuits having a plurality of resonant or zero reactance points, the circle may be traversed several times, but each crossing of the horizontal axis can correspond only to a resonant point or to the zero and infinite frequency points.

The effect of internal resistance in the reactance X has been neglected. The effect of such internal resistance is to cause the impedance and admittance diagrams to depart from true circles and become spiral-shaped. The rate at which the spiral curls up or unwinds depends upon the amount of effective resistance in reactance X. It will be clear that for circuits having plural resonant points and internal resistance, the diagram will not overlap itself as shown in Fig. 4F, since in such cases consecutive crossings of the spiral curve do not overlap.

The above analysis has merely been descriptive of the circuit properties in Fig. 3. It will now be shown how the circuit of Fig. 3 contains characteristics at least approaching the desirable properties illustrated in Figs. 1 and 2. Thus, let it be assumed that reactance X is of such a nature that it exhibits a resonance point. This resonance point may either be of a series resonance nature analogous to that shown at point $f_r$ in Fig. 4D and by point $f_{r_1}$ of Fig. 4F, or it may be of a parallel resonance nature, as shown by point $f_r$ in Fig. 4E or by point $f_{r_2}$ of Fig. 4F.

Assuming for the moment that reactance X exhibits a series type resonance and referring to Fig. 4A and its admittance diagram, reactance X may be chosen to exhibit its series resonance at the desired carrier or operating frequency $f$. At this frequency, therefore, the total admittance connected across source I is given by vector OD. For a frequency slightly larger, corresponding to an upper sideband component, the admittance of the circuit of Fig. 3 will be given by vector OC and for a frequency slightly smaller, corresponding to a lower sideband component, by vector OA. Now consider one particular frequency component $E_1$ of the voltage E of source I (the error voltage) corresponding to one sideband of the error wave of Equation 2. This component is chosen to have phase corresponding to a vector along the OG axis. Since current equals admittance times voltage, then the current flowing in the circuit (through resistor r) due to this component, for the particular admittance OA corresponding to this particular frequency component will be represented by a vector in the direction of OA. By a proper choice of current scale, vector OA may represent this current.

Again, by proper choice of voltage scale, vector OA may also be made to represent the value of the current OA times resistance $r$, and will, therefore, represent the volt drop across resistance $r$ due to $E_1$. Since at resonance the voltage drop across $r$ must equal the resonant frequency component of source voltage $E_1$, vector OD then to this scale represents the voltage $E_1$. The difference between vector OD and vector OA, namely, vector DA, will represent the difference between the component voltage $E_1$ across source I and the volt drop across the resistance $r$, and is, therefore, the output voltage V across the resistor R due to this frequency component.

From the diagram of Fig. 4A, it will be seen that this voltage V, at least for small excursions on either side of point D, will be approximately proportional in magnitude to the frequency departure from resonance, will lead voltage $E_1$ by approximately 90° for frequencies greater than $f$ and will lag voltage $E_1$ by approximately 90° for frequencies less than $f$. In other words, the output rate voltage V will have the characteristics shown approximately by the dotted lines on Figs. 1 and 2. In Fig. 1 the dotted line fails to approach zero response at the resonant or carrier frequency $f$ because of the unavoidable internal resistance in any inductance or reactance X. Hence, it will be seen that this circuit of Fig. 3 at least approximately, and for a restricted range of frequency departures from the carrier frequency, will produce an output voltage across resistance R fulfilling the desirable characteristics of Figs. 1 and 2. For a parallel-type resonance, the output voltage should be derived from across resistance $r$, or at least a portion thereof.

Figure 5:
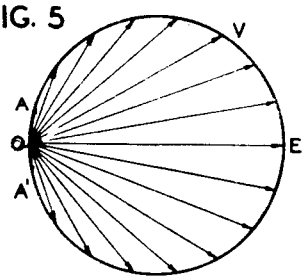
Fig. 5 is a further diagram showing the transmission characteristics of the circuit of Fig. 3.

Since the vectors such as DA and DC indicating the voltage output all have their final points at point D and initial points along the circle of the diagrams, the relationship of the output or rate voltage V to the input or error voltage E may be shown as in Fig. 5 by a so-called transmission diagram. Here the input voltage will be vector OE and point O corresponds to the resonant frequency. To any other frequency there corresponds a point on the circle more or less adjacent point O, depending upon the amount of frequency departure, and the vector from point O to the point on the circle will represent the output voltage component V. It will be clear from this diagram again that the output voltage component V bears a phase approximately 90° in advance or retard of voltage $E_1$, according as the frequency is above or below that of resonance, and its amplitude will bear an approximately proportional relationship to the frequency deviation for a restricted range of frequency deviation such as that occurring between points A and A' of Fig. 5. This range may be made to extend for about 25% of the carrier frequency $f$.

Accordingly, by modifying each frequency component of the error voltage in this manner, the resultant voltage will be the required alternating rate voltage described in Equation 3 or 4.

Figure 6:
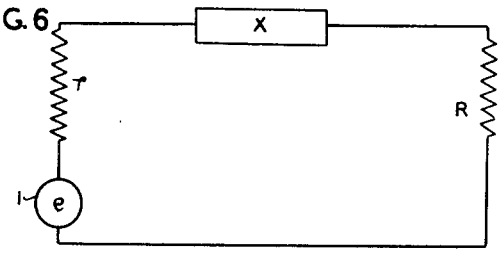
Fig. 6 shows a modification of the invention.
Figure 7:
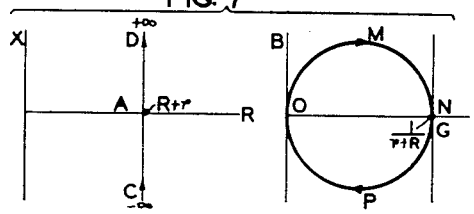
Fig. 7 shows an impedance and admittance diagram useful in explaining the operation of the device of Fig. 6.

Fig. 6 shows a further circuit which will also approximately produce the desired characteristics shown in Figs. 1 and 2. This circuit is composed of a voltage source I of error signal in series with a resistance $r$, which may be the internal resistance of the source I, a reactance X, and a resistance R. The output alternating rate voltage is then taken from across R for parallel-type resonance of reactance X at the operating frequency $f$, or from across reactance X for series-type resonance X. In this instance the impedance diagram or locus, as shown in Fig. 7, is a straight line DAC parallel to the reactance axis and intersecting the resistance axis at an impedance value R+$r$. This locus will be traversed in the direction shown by the arrows for increasing frequencies. The corresponding admittance diagram, however, is again a circle, but, in this instance, tangent to the susceptance or B— axis.

For a simple capacitance type of reactance X, at zero frequency, the reactance is negatively infinite. For infinite frequency the reactance is zero. Accordingly, for this case the impedance locus will be from point C, representing negative infinity, to point A. In the same way, the admittance locus will be the semi-circle O—M—N.

For pure inductance, the impedance locus will be from point A to positive infinity, or point D, and the corresponding admittance locus will be semi-circle N—P—O.

For a series resonance circuit, the impedance locus will be from negative infinity, or point C, through point A to positive infinity, at point D, and the corresponding admittance locus will be circle O—M—N—P—O. Here point A corresponds to the series resonant condition as does also point N.

If reactance X is a parallel resonant circuit, the impedance locus starts at point A for zero frequency and extends toward positive infinity or point D at resonance, and then picks up from negative infinity at point C and comes back to point A, being in a sense a closed circle of infinite radius. In a similar manner the admittance locus will be from point N around the circle N—P—O—M—N.

Here again, for other types of reactance combinations, the locus may be traversed several times, each crossing of the R axis or each passing to infinity corresponding to zero, infinite or resonant frequency, and each crossing of the G axis corresponding to zero, infinite, or resonant frequency. It will be evident that the vector diagrams applied to Fig. 4A may also be applied to Fig. 7, where X has a parallel type resonance, and will thereby produce a transmission diagram exactly similar to Fig. 5. Hence, the circuit of Fig. 6 is equivalent to the circuit of Fig. 3, at least insofar as the results produced are concerned.

Both the circuit of Fig. 6 and that of Fig. 3 bear the disadvantages which accompanies the existence of internal resistance. As shown in Figs. 1 and 2, this causes the transmission or response at the carrier frequency $f$ to be other than zero. As a result, these two circuits find their greatest usefulness only for high resistance loads, where the resistance of the load is so much greater than the internal resistance of the reactance components that the latter may be neglected in comparison. Such a limitation upon the use of the device of the invention is not desirable, and accordingly recourse is had to bridge-type networks to overcome this difficulty.

Figure 8:
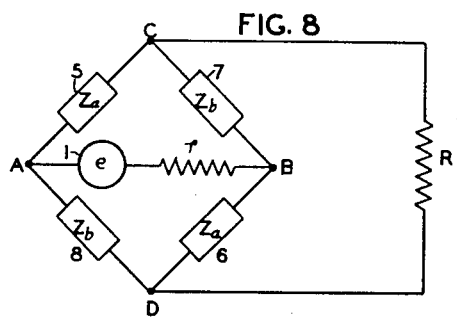
Figs. 8 to 10 show circuit diagrams useful in explaining the theory of the bridge-type circuits of the present invention.

Fig. 8 shows the general circuit for a symmetrical bridge network. Here the bridge is composed of four arms, each containing, in general, any impedance. For the purpose of simplifying the analysis and also for simplifying the construction of the device, the bridge is made symmetrical; that is, opposite arms are made to have equal impedance. As shown, impedance $Z_a$ comprises one pair of opposite arms 5, 6 and impedance $Z_b$ comprises the other pair of opposite arms 7, 8. One diagonal A—B is energized from error voltage source I having internal resistance $r$. The other diagonal C—D feeds the output circuit having load resistance R.

Figure 9:
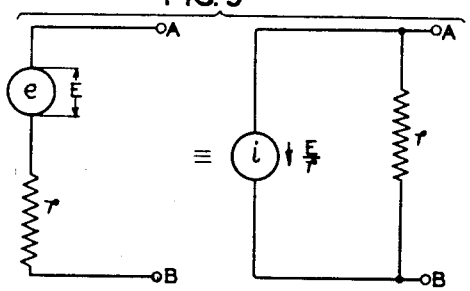

For purposes of analysis, it is more convenient to treat with so-called "current sources," namely, sources of constant current. An elementary theorem of circuit analysis, shown schematically in Fig. 9, permits the transfer from a voltage source to a current source, as follows: If the voltage source has a constant voltage output E and an internal resistance $r$, it is the full equivalent of a current source having constant current output of magnitude $$\frac{E}{r}$$

and shunted by the resistance $r$. As a simplified proof of this theorem, it may be seen that at short circuit and open circuit, the currents and voltages across the terminals A and B of these two sources illustrated in Fig. 9 will be identical respectively. Accordingly, since these two circuits are equivalent for two conditions, and since they have only two parameters, it will be evident that they will be fully equivalent under all conditions.

A further theorem of network analysis described in the book "Communication Networks," vol. 2, by E. A. Guilleman, published by John Wiley and Sons (1935) on page 423 thereof, recites that, in a symmetrical bridge network such as shown in Fig. 8, if the same shunt or series impedance occurs in each arm of the bridge, that shunt or series impedance may be removed from each arm and the bridge will exhibit identical characteristics if the load and the source are each respectively shunted by or put in series with this same impedance. The converse of this theorem also holds. Hence, if in the circuit of Fig. 8 the voltage source $e$ is converted into a current source $i$ in accordance with the transformation shown in Fig. 9, and if the internal resistance $r$ is made equal to the load resistance R, then, by applying the converse of the theorem stated above, there is obtained the circuit shown in Fig. 10.

Figure 10:
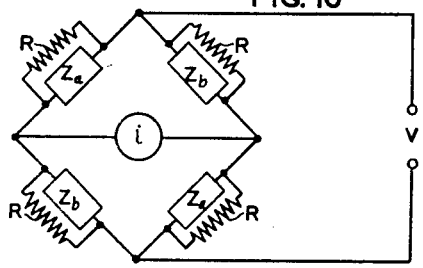
Figure 11:
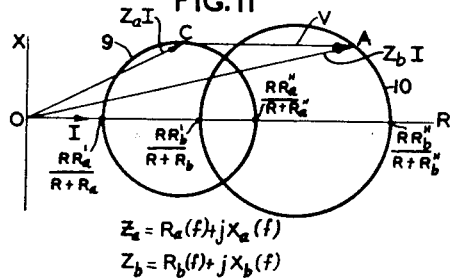

The impedance diagram of the circuit of Fig. 10 will be as shown in Fig. 11, where $R_a$ and $R_b$ represent the effective resistances of the impedance $Z_a$ and $Z_b$, which resistances will normally be a function of frequency, and $X_a$ and $X_b$ represent the effective reactances of these two impedances, which are also functions of frequency. The impedance locus of the arm of the bridge shown in Fig. 10 containing impedance $Z_a$ will be a circle 9 with center on the R axis, which intersects the R axis at the two points representing the minimum and maximum impedance of the parallel circuit composed of $Z_a$ and resistance R. If the minimum effective resistance of impedance $Z_a$ is assumed to be $R'_a$ and the maximum to be $R''_a$, then the minimum and maximum impedance values for this arm of the bridge will be as shown in Fig. 11, namely, as the points where the circle 9 intersects the R axis. In a similar way the circle 10 represents the impedance locus of the other arm of the bridge of Fig. 10.

Since the output from the bridge of Fig. 10 is open circuited, the current I in all arms will be equal. Let this current I be represented by unit vector OI in Fig. 11. Then, for a particular value of frequency, to which correspond points A and C of the diagram, the vector OA will represent the volt drop $Z_b I$ across the impedance $Z_b$ and vector OC will represent the volt drop $Z_a I$ across impedance $Z_a$. The difference between these two vectors, namely, vector CA, will then be the voltage output V. So far, the impedances $Z_a$ and $Z_b$ have in no way been particularized, and hence may be any impedances.

Figure 12:
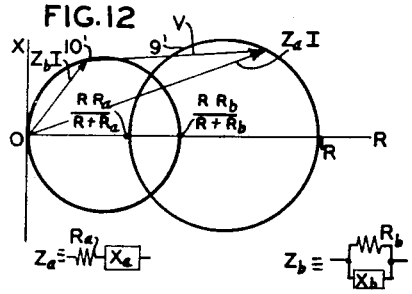

For further convenience in the analysis, let it be further assumed that impedance $Z_a$ is composed of a fixed series resistance $R_a$ and a pure reactance $X_a$ connected in series. Also let it be assumed that impedance $Z_b$ is composed of pure resistance $R_b$ connected in parallel with a pure reactance $X_b$. The impedance loci 9', 10' of these two impedances will then be as shown in Fig. 12.

By proper choice of values, these circles 9' and 10' may be made of the same size and may be so adjusted that their point of intersection corresponds to the same frequency for each of the two circles. The proper choice of values is obtained from the following considerations: From Fig. 12, it will be clear that the diameter of circle 10' is equal to $$\frac{R_b R}{R + R_b}$$

while that of circle 8' is $$R = \frac{RR_a}{R+R_a}$$

The condition that both circles shall be the same size necessitates the equality of these two quantities, and leads to the condition:

$$R^2 = R_a R_b \quad (5)$$

The requirement that the two circles shall intersect leads to the relation:

$$R_b > R_a \quad (6)$$

Since R is fixed, this imposes a definite relation between $R_a$ and $R_b$.

It is to be noted that, for the purposes of Figs. 13–17, the circular loci need not be of equal diameter. However, this condition is necessary, as will be seen, for the transformation from Fig. 17 to Fig. 20.

The condition that the point of intersection shall correspond to the same frequency on both loci of Fig. 12 imposes the condition that, at frequency $f$, $Z_a = Z_b$. This leads to the conditions:

$$X_{ao} X_{bo} = R_a R_b \quad (7)$$

$$\frac{X_{ao}}{X_{bo}} = 1 - \frac{R_a}{R_b}$$

where $X_{ao}$ and $X_{bo}$ are the values of $X_a$, $X_b$ at frequency $f$.

It is thus clear that, if both conditions (5) and (7) are imposed, the choice of any one of the four quantities $X_{ao}$, $X_{bo}$, $R_a$, $R_b$, will completely determine all four of these quantities.

Imposing these conditions (5) and (7) on the bridge circuit of Fig. 10 (which then becomes equivalent to Fig. 17), for pure capacitive reactances $X_a$ and $X_b$, then the impedance diagram, is as in Fig. 13. If the current through one pair of adjacent arms of the bridge at a particular frequency corresponding to points A and C is represented by vector OI, the vector OA will represent the volt drop $Z_a I$ across impedance $Z_a$ and vector OC will represent the volt drop $Z_b I$ across impedance $Z_b$, so that vector CA represents the output voltage V. Several such output voltages are indicated in Fig. 13, corresponding to different frequencies.

From the diagram of Fig. 13, it is clear that at the operating frequency corresponding to point D the output from the bridge will be zero. For a slightly larger frequency, or upper side band of the alternating error voltage, it will be something like the vector EF. For a frequency slightly smaller than the carrier frequency, such as a lower sideband, the output will be the vector MK. As will be evident from the drawing, these vectors have a phase relationship plus or minus 90° with respect to that of current vector I and therefore with respect to voltage E, as will be clear from Fig. 9. Their amplitudes, moreover, are nearly proportional to the frequency deviation from the carrier frequency. If the frequency corresponding to point D is taken to be the operating frequency I, the voltage output V of this bridge then follows the curve 12 of Figs. 1 and 2, and is seen to approximately fulfill the desired conditions set forth in these diagrams.

If reactances $X_a$ and $X_b$ are taken as pure inductances, the impedance diagram will be as shown in Fig. 14. Here again the circuit constants are so chosen that the semi-circles are of equal size, and their point of intersection corresponds to the same frequency for each semi-circle, and the results are the same as with Fig. 13.

Instead of using pure inductances or pure capacitances, it is possible to use tuned circuits combining inductances and capacitances, in any combination. The impedance diagram for this situation is as shown in Fig. 15. Here the values of the components are chosen to make the circle diagrams of equal size and may be further chosen so that either point A or point B corresponds to the same frequency for both diagrams. Then the voltage output will be as shown by the vectors associated with each point A or B and again will approximately fulfill the desired conditions for a restricted range of frequency excursions. The only necessary conditions are those set forth in (5), (6) and (7).

A further special case is as shown in Fig. 16, which is the impedance diagram for the situation where one of the reactances $X_a$ or $X_b$ is a series tuned circuit, the other reactance being a parallel tuned circuit, both being tuned to the same frequency, namely, the operating frequency $f$. In this case, the circles need not be made the same size. In effect, this diagram of Fig. 16 is a combination of the impedance diagrams of Figs. 4D and 4E, and again it will be clear that the conditions set forth in Figs. 1 and 2 are approximately fulfilled, the resultant voltage outputs for several frequencies being as shown.

Fig. 17 shows the circuit diagram with a voltage source $e$ corresponding to the impedance diagrams of Figs. 13 to 16. It may be shown by use of the diagrams of Figs. 18 and 19 that this circuit diagram of Fig. 17 is the full equivalent of the diagram of Fig. 20. Thus, the bridge or symmetrical lattice shown in Fig. 17 may be split up into two parallel connected bridge lattices as shown in Fig. 18, in the following manner:

The arms AC and BD of Fig. 17, each comprising parallel connected resistance $R_b$ and reactance $X_b$ are each split up into two parallel arms, A'C' and B'D' containing only resistance $R_b$, and arms A"C" and B"D" containing only reactance $X_b$.

Arms AD and BC, each comprising series connected resistance $R_a$ and reactance $X_a$, are each split into two parallel connected arms, A'D', A"D" and B'C', B"C" in Fig. 18. Arms A'D' and B'C' comprise a resistance $R_b$ in series with a reactance $X_1$, while arms A"D" and B"C" comprise a resistance $R_2$ in series with reactance $X_2$.

In order that the resolution of impedance $Z_a = R_a + jX_a$ into parallel connected impedances $Z_1 = R_b + jX_1$, and $Z_2 = R_2 + jX_2$ may be valid for all frequencies, it is necessary that $$\frac{X_2}{R_2} = \frac{X_1}{R_b} = \frac{X_a}{R_a} \quad (8)$$

Hence $$X_1 = \frac{R_b}{R_a} X_a \quad (9)$$

$$R_2 = \frac{R_b}{R_b - R_a} R_a \quad (10)$$

$$X_2 = \frac{R_b}{R_b - R_a} X_a \quad (11)$$

This resolution is made possible only by the fact that $R_b > R_a$, as shown in (6) above.

By application of the network theorem stated above, each of these two parallel bridges or lattices may be transformed into a T-network, as shown in Figs. 19 and 20. Thus, it will be seen that the upper of the two parallel connected bridges of Fig. 18 contains the resistance $R_b$ in each arm. In accordance with the above theorem, this resistance may be removed from each arm and placed in series with the input and output. This leaves in arms A'C' and B'D' a pure short-circuit while arms A'D' and B'C' contain a pure reactance having the value $X_1$ defined by (9).

In a similar fashion, from the lower of the two parallel connected bridges of Fig. 18 a common reactance $X_b$ may be removed from each arm and placed in series with the input and output leaving two short-circuited arms and two impedances each having resistance $R_2$ and reactance $X_2-X_b$, as shown in Fig. 19. This circuit of Fig. 19 may be redrawn as shown in Fig. 20, and as will be seen, is really two T-networks connected in parallel.

With respect to the circuit of Fig. 17, this circuit of Fig. 20 offers many advantages. First, it will be seen that the number of elements is reduced. Second, and more important, the circuit of Fig. 20 may be used in circuits having a common ground since the leg BD is now merely one terminal. This is an important practical advantage over the circuit of Fig. 17 in which no part of the circuit can be effectively grounded.

The circuit of Fig. 20 is the full equivalent of that of Fig. 17, for all frequencies, provided that the reactance $\frac{1}{2}(X_2-X_b)$ is physically realizable; that is, provided a combination of capacitance and inductance may be formed providing a resultant reactance which varies in magnitude with frequency in the same manner as does $\frac{1}{2}(X_2-X_b)$. It may be shown that this is always possible if each type of series component of reactance contained in $X_b$ is also contained in $X_2$ (and therefore in $X_a$, which is proportional to $X_2$). That is, if $X_b$ is resolved as far as possible into a plurality of series-connected reactances, and if each of these types of reactances is present as a series component of $X_a$, it will be possible to form the parallel T-network. Hence, in general, it will be possible to find more derivative-taking networks of the type of Fig. 17 than of Fig. 20.

The simplest type of circuit of Fig. 20 satisfying these conditions is one where $X_2=X_b$, so that, from (11)

$$X_b = \frac{R_b}{R_b-R_a}X_a \quad (12)$$

whereby $X_a$ and $X_b$ are the same type of reactance, differing only by a constant factor. This special case eliminates one circuit element of Fig. 20. The impedance diagram for such a circuit, where the reactances are pure capacitances, is as in Fig. 13, or when the reactances are pure inductances, as in Fig. 14.

In such case, from (5), (9), (10) and (11) it follows that $$\tfrac{1}{2}R_2 = \tfrac{1}{2}\frac{R_b}{K} \quad (13)$$

and $$\tfrac{1}{2}X_1 = \tfrac{1}{2}KX_b \quad (14)$$

where $$K = \frac{R_b^2}{R^2}-1 = \frac{R_b}{R_a}-1 \quad (15)$$

It is not necessary that $X_2$ be the same type of reactance as $X_b$. Thus, for illustration, $X_2$ (and hence $X_a$) may be a series resonant circuit formed of series inductance and capacitance, while $X_b$ in such case may be a pure inductance or capacitance, or also a series resonant circuit. Many other types of circuit may be devised in accordance with the above considerations.

Figure 21:
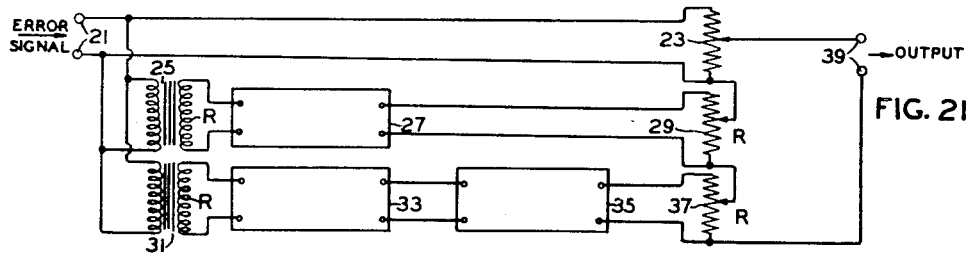
Figs. 21 and 22 show circuits for combining and cascading rate circuits.
Figure 22:
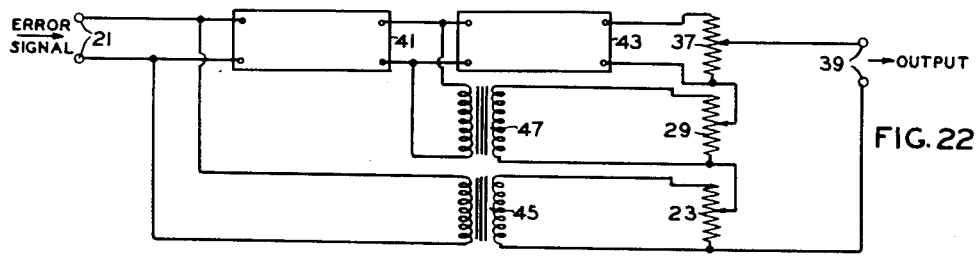

The circuits described above are adapted to directly produce alternating current derivative or rate signals. In most applications it is necessary to combine the actual error signal with first and/or second derivative signals. Figs. 21 and 22 show two circuits for effecting this.

Referring to Fig. 21, the error signal appearing across terminals 21 is supplied directly to an adjustable potential divider or potentiometer 23. The same signal is supplied by way of a coupling and matching transformer 25 to a network 27 of the type already described, the output of network 27 being supplied to a further potentiometer 29. This potentiometer 29 preferably forms the load resistor R, and transformer 25 by proper matching provides this same impedance as the input impedance to network 27.

The error signal 21 is also provided by way of coupling and matching transformer 31 to two cascaded derivative networks 33, 35 whose output impedance is formed by potentiometer 37. Here again transformer 31 matches the input impedance to the load impedance as required by the considerations already described. The two cascaded networks 33, 35 provide a second derivative signal.

The three potentiometers 23, 29, 37, have their outputs connected in series to the output terminals 39, which thereby provide a combined signal having error, first derivative and second derivative components, each component being separately adjustable in magnitude by its respective potentiometer. Amplifiers may be provided wherever desirable if increased magnitude of any or all components is needed.

Fig. 22 shows a modification of Fig. 21. Here only two derivative networks 41, 43 are needed, the various components being tapped off at the proper points through coupling transformers 45, 47 as clearly shown in the figure.

It will be clear that derivatives of as high an order as desired may be obtained by extending these circuits.

In Fig. 25, we have illustrated our invention as embodied in a servo motor control circuit. The system is schematically illustrated, mainly for exemplary purposes, and to show a source of alternating signal voltage which is modulated in amplitude in accordance with a measured quantity and in which the rate taking circuits of the present invention are embodied for the purpose of deriving, from the alternating signal voltage, alternating signal voltage components which in amplitude are substantially proportional to the rate of change of amplitude of the original signal.

In Fig. 25, we have shown a data transmission system comprising a transmitter indicated generally at 50 which may be of the Selsyn type as hereinbefore indicated. The rotor 51 of the transmitter is excited from any suitable source 52 of alternating voltage of predetermined frequency. The rotor is adapted to be driven from a control shaft 53 which, in turn, may be operated as a measure of a quantity such as the angular rotation of a handwheel 54 as shown. The Y-connected stator windings 55 are connected in polycircuit fashion with the corresponding Y-connected stator windings 56 of a single generator or transformer 57. The rotor winding 58 of the signal transformer is connected across the terminals 21 which may correspond to the terminals 21 in Fig. 21. Any signal voltage which is developed in the rotor winding 58 is supplied to the amplifier 59 where an alternating signal voltage proportional to the rate of change of error or relative displacement between the rotors 51 and of the transmitter and transformer will be developed and supplied together with a voltage component proportional to the signal developed in rotor 58 across the output terminals 39. In other words, the amplifier 59 may comprise the circuits shown in Fig. 21, and it, of course, may also include suitable stages of amplification for the signal voltages so derived so that the output voltages appearing across the terminals 39 may be amplified versions of the error signal delivered by the transformer 57 and one or more time derivatives thereof obtained in the manner hereinbefore particularly pointed out.

To complete the system, we have shown a motor 60 which may be of any desired type and shown herein for illustration purposes as a two-phase motor. One phase of the motor is energized by the output of amplifier 59, while its other phase is energized from a suitable source of alternating voltage, such as the source 52 hereinabove referred to. Motor 60 drives the rotor 58 of signal transformer 57 through the medium of shafts 61, bevel gears 62, shaft 63, bevel gears 64 and the follow-up shaft 65 to which the rotor of the transformer is connected. The system of Fig. 25 will function to cause the follow-up shaft 65 to rotate substantially in synchronism with shaft 53 and to reproduce the angular movements of the control shaft 53.

The above considerations were stated with the implicit assumption that all circuit elements were formed of the conventional capacitance, inductance, and resistance. It is also possible to use so-called "negative" circuit elements, as discussed in the paper "Negative circuit constants" by L. C. Verman in the April, 1931, Proceedings of the Institute of Radio Engineers, vol. 19, No. 4, p. 676. The reactances formed by these negative circuit constants will vary with frequency in a manner similar to the ordinary inductance or capacitance but the phase shift produced by these reactances will be opposite to that ordinarily associated with the conventional inductance and capacitance. Such circuits are well known in the art and their details form no part of the present invention.

The use of such reactances permits the realization of Fig. 20 from Fig. 17 under all conditions.

Figure 23:
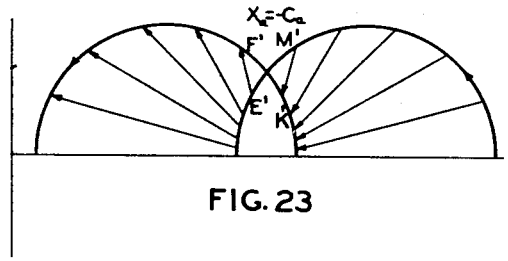
Figs. 23 and 24 are impedance diagrams useful in explaining the use of negative reactance elements in the circuits of Fig. 17 or Fig. 20.

The effect of such negative reactances upon an impedance diagram is to reverse the direction of transversal of the locus with increasing frequency. As is clear from all of the impedance diagrams used thus far, increasing frequency produces a clockwise transversal of the impedance locus. With negative reactances, however, counter-clockwise transversal is produced. As a result, the impedance diagram of a bridge circuit such as Fig. 17, using negative capacitances, will be as shown in Fig. 23, instead of Fig. 13, which shows the diagram for conventional capacitances.

Here the vector E'F' corresponds to the same frequency as the vector EF in Fig. 13 and the vector K'M' corresponds to the similar vector KM in Fig. 13. Examining these corresponding vectors of Figs. 13 and 23, it will be seen that by adding the vector EF of Fig. 13 to E'F' of Fig. 23, the resultant will have a phase shift of exactly 90° with respect to the impressed current and this 90° phase shift will be kept constant no matter what the frequency deviation is. In other words, by connecting in series the output of a bridge which yields the impedance diagram of Fig. 13 with that of a bridge yielding the impedance diagram of Fig. 23, it is possible to obtain exactly the theoretical phase characteristic shown to be desirable in Fig. 2. Such a connection is termed a "parallel-series" connection. The amplitude characteristic remains substantially the same as in curve 12 of Fig. 1.

Figure 24:
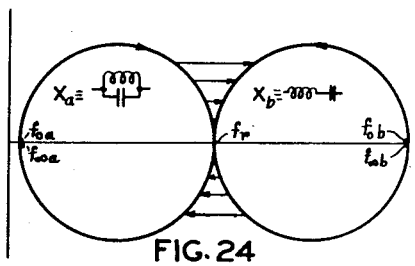

Another way of using the negative reactances is shown in Fig. 24. Here the left circle diagram may be produced by the conventional series tuned circuit. The right circle diagram will be produced by a series tuned circuit whose elements are negative reactances. They are adjusted to have a common resonant frequency determined by point $f_r$.

By the method of analysis used above, it will be seen that such a bridge, namely, one for which one pair of opposite arms is a conventional tuned circuit and for which the other pair of opposite arms is a tuned circuit composed of negative reactances both being tuned to the same resonant frequency, will produce as its output voltage the series of vectors shown in Fig. 24. These vectors have constant but reversing phase upon passing through $f_r$. In this case, they will have phase equal to or opposite the phase of the impressed current vector.

Also, for a restricted range of frequency departures from the balance frequency $f$, the amplitude of the output will vary as the square of the frequency departure. Hence, applying the method of Equations 1 to 4, it will be clear that this network offers an output modulated by the second derivative of the error, and a second derivative network is obtained, which may be used in place of the cascaded first derivative networks of Fig. 21.

It will be evident that many combinations of reactances, both negative and positive, may be formed in accordance with the above analysis to provide the novel derivative networks of the invention.

By the term "rate signal" as used in the following claims is meant a signal corresponding to the first or a higher order derivative of the error.

It will be clear that any of the modifications of the present invention is adapted to convert any suppressed-carrier modulated wave into another suppressed-carrier modulated wave whose modulation wave is a time derivative of that of the first modulated wave.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a control system comprising a reference member, a source of alternating voltage of predetermined frequency and a signal voltage generator energized from said source and operated by said reference member for producing an A. C. voltage varying in magnitude with changes in displacement of said member and reversing in phase with reversals in the direction of said displacement, the combination with said signal generator of means forming a parallel T-network including impedance and reactance elements, said network having its input connected to receive the voltage output of said generator, and the values of said circuit elements being so chosen and said elements being so constructed and relatively arranged as to provide an A. C. voltage output substantially proportional to a time derivative of the quantity measured by the voltage supplied thereto.

2. The combination recited in claim 1 wherein one of the parallel networks comprises series resistance elements and shunt reactance elements.

3. The combination recited in claim 1 wherein one of said networks comprises series resistance elements and shunt reactance elements and the other comprises series reactance elements and shunt resistance elements.

4. In a control system comprising a reference member, a source of alternating voltage of predetermined frequency and a signal voltage generator energized from said source and operated by said reference member for producing an A. C. voltage varying in magnitude with changes in displacement of said member and reversing in phase with reversals in the direction of said displacement, the combination with said signal generator of means forming an impedance-reactance network having its input connected to receive the voltage output of said signal generator, the values of the network elements being so chosen and said elements being so constructed and relatively arranged in circuit as to provide an A. C. voltage output substantially proportional to a time derivative of the quantity measured by the voltage supplied thereto.

5. In a control system comprising a reference member, a source of alternating voltage of predetermined frequency and a signal voltage generator energized from said source and operated by said reference member for producing an A. C. voltage varying in magnitude with changes in displacement of said member and reversing in phase with reversals in the direction of said displacement, the combination with said signal generator of means forming an impedance-reactance network having its input connected to receive the voltage output of said signal generator, the values of the network elements being so chosen and said elements being so constructed and relatively arranged in circuit as to suppress voltages of said predetermined frequency but to supply a voltage output when the frequency of input voltage components vary from said predetermined frequency.

6. In a control system comprising a reference member, a source of alternating voltage of predetermined frequency and a signal voltage generator energized from said source and operated by said reference member for producing an A. C. voltage varying in magnitude with changes in displacement of said member and reversing in phase with reversals in the direction of said displacement, the combination with said signal generator of bilateral means forming an impedance-reactance network having its input connected to receive the voltage output of said signal generator, the values of the network elements being so chosen and said elements being so constructed and relatively arranged in circuit as to supply an A. C. voltage output having an amplitude substantially proportional to the difference between the frequency of an input voltage component and said predetermined frequency.

7. The combination recited in claim 4 wherein the reactance and impedance are connected in series across the input.

8. The combination recited in claim 4 wherein the reactance and impedance are connected in parallel across the input.

9. The combination recited in claim 4 wherein the reactance exhibits a series type resonance at said predetermined frequency and is connected in series with said impedance across the input.

10. The combination recited in claim 4 wherein the reactance exhibits a parallel type resonance at said predetermined frequency and is connected in series with said impedance across the input.

11. The combination recited in claim 4 wherein the reactance exhibits a series type resonance at said predetermined frequency and is connected in parallel with said impedance across the input.

12. The combination recited in claim 4 wherein the reactance exhibits a parallel type resonance at said predetermined frequency and is connected in parallel with said impedance across the input, and a resistance in series with said reactance-impedance circuit.

13. In a control system of the character described, the method of producing an A. C. rate signal proportional to the rate of change of a quantity which comprises modulating an alternating carrier wave in amplitude in accordance with a measure of said quantity to produce side band frequencies, and producing a voltage proportional in amplitude to the difference in frequency between a side band frequency and said carrier frequency.

14. In a control system of the character described, the method of producing an A. C. rate signal proportional to the rate of change of a quantity which comprises modulating an alternating carrier wave in amplitude in accordance with a measure of said quantity to produce side band frequencies, and deriving from a side band frequency a voltage proportional in amplitude to the difference in frequency between said side bands and said carrier frequency.

15. In a control system of the character described, the method of producing an A. C. rate signal proportional to the rate of change of a quantity which comprises modulating an alternating carrier wave in amplitude in accordance with a measure of said quantity to produce side band frequencies, attenuating said side band frequencies inversely in accordance with the difference in frequency between said side bands, and employing an attenuated side band to provide a voltage proportional in amplitude to the rate of change of said quantity.

16. In a control system of the character described, the method of controlling a quantity in accordance with a reference value which comprises modulating an alternating voltage in amplitude in accordance with the amount of disagreement in values of said quantity and reference to produce an alternating signal voltage having an amplitude proportional to said disagreement value and side band frequencies, producing a voltage component proportional in amplitude to the difference in frequency between a side band frequency and said carrier frequency, and controlling said quantity in accordance with the signal voltage and said voltage component.

GIFFORD E. WHITE.
MORRIS RELSON.

REFERENCES CITED

The following references are of record in the file of this patent:

UNITED STATES PATENTS

| Number | Name | Date |
| --- | --- | --- |
| 1,315,539 | Carson | Sept. 9, 1919 |
| 1,516,518 | Carson | Nov. 25, 1924 |
| 1,921,983 | Wittkuhns | Aug. 8, 1933 |
| 2,093,665 | Tellegen | Sept. 21, 1937 |
| 2,251,973 | Beale et al. | Aug. 12, 1941 |
| 2,294,941 | Tuttle | Sept. 8, 1942 |